United States Patent Office 3,312,586
Patented Apr. 4, 1967

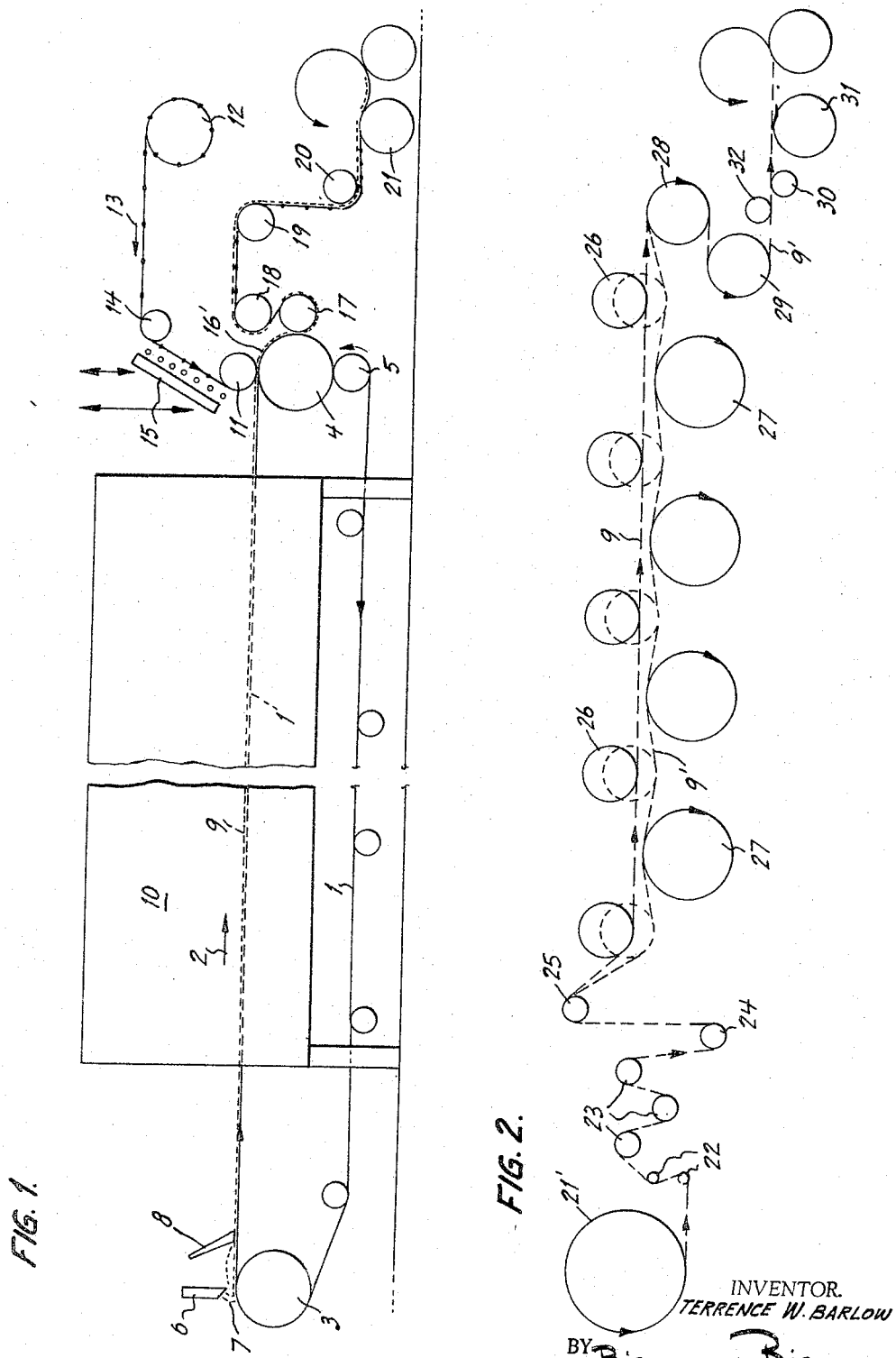

3,312,586
METHOD OF MAKING SYNTHETIC SUEDE AND PRODUCT THEREOF
Terrence William Barlow, 15 Ashwood Crescent, Marple, England
Filed Oct. 24, 1965, Ser. No. 504,369
14 Claims. (Cl. 161—109)

The present invention relates to a synthetic simulated suede and a method of making it. The present application is a continuation-in-part of pending application Ser. No. 165,317, filed Jan. 10, 1962 now abandoned.

Among the prior art methods of manufacture of artificial suede is by coating and leaching. In such process, an expandable polyvinyl chloride paste, i.e., a paste embodying a blowing agent, is spread in known manner onto a suitable fabric base, such as a textile fabric previously coated with a bonding agent, with or without a sealing coat to avoid penetration to the reverse side thereof. Prior to gelling and blowing, a surface indenting substance of a granular and soluble nature, which is relatively non-fusible under conditions for gelling the polyvinyl chloride, e.g., common salt, is then dusted onto the wet surface of the paste in the required proportion so that the granules sink into the polyvinyl chloride paste. The polyvinyl chloride paste is then heated to produce gelling and blowing, and afterwards the indenting agent is washed or leached out. The polyvinyl chloride surface is finally buffed or abraded to give it a suede-like appearance and feel.

In another prior art process, an indented or patterned surface is applied to a synthetic resin sheet formed by spreading a resin on a base, by roller or like known means after gelling, but this operation presents considerable working difficulties and detracts from, if not altogether destroys, the possibility of obtaining the desired final appearance and feel in the product.

It is among the objects of the present invention to provide an improved and simplified method for the manufacture of artifical suede from thermoplastic resin.

It is also among the objects of this invention to provide a method whereby the artificial suede can be made porous.

It is further among the objects of this invention to provide an artificial suede with a feel which closely resembles that of real suede.

The present invention is based on the discovery that a desirable product can be produced by applying a layer of plastisol which contains a blowing agent onto a support surface. The surface comprises mineral particles fixed to a base and inert to the plastisol. The layer is then leveled to the peaks of the particles and introduced into an oven for heating. This causes gelling and blowing of the layer to form cells therein. A fabric is laminated to the back of the layer and the laminate is stripped from the surface. The exposed surface is abraded to rupture at least some of the surface cells thereby yielding a suede-like surface.

It is sometimes desirable, for example, for speed of production or if the gelled resin tends to adhere to the patterned surface, to treat the latter with a releasing agent which facilitates separation of the sheet therefrom. A material having a suitable releasing surface is already known which has been treated for another purpose with a substance which operates effectively as a releasing agent. Such known material is, for example, an abrasive coated paper or other abrasive coated base, to which the abrasive granules have been bonded by a synthetic resin, and to which a final resin overspray has been applied.

The invention comprises the method of producing a thermoplastic synthetic resin-like material having a random matte indented surface, comprising the steps of spreading a layer of thermoplastic resin onto a support surface comprised by a multiplicity of raised indentation-forming particles secured to a base, in such a manner that the resin is leveled off to the peaks of such particles, whereby the resultant gelled sheet is rendered perforate, gelling the resin by the application of heat, allowing the product to cool and separating the gelled sheet from the support surface.

Conveniently, the resin incorporates a blowing agent, for the purpose of enhancing the cellular structure of the formed sheet and improving the air-pervious nature of the finished article, this blowing agent being released during the gelling of the resin.

It is preferred to provide the resin sheet with a backing sheet and this is suitably bonded to the gelled resin by application thereto whilst the gelled resin is still hot. A textile fabric forms a particularly suitable backing sheet.

After passing through the spreader, the sheet, with its applied coating of resin is carried through a heating zone provided by a plurality of heaters located above the sheet and mounted in such manner that they can be adjusted in height for varying the temperature or turned to direct the heat away from the sheet as a pre-caution in case the traverse of the sheet was momentarily halted.

After the resin has been gelled by the heating and while still hot, the sheet of backing material, such as knitted or woven cloth is laminated therewith, such backsheet having first been treated with a base coating of a medium which will assist bonding of the film thereto but which will inhibit "striking through" of the coating thereafter applied thereto. This backing is then laminated with the film in a manner known for such operation, by passing through a roller nip consisting of a lower steel roller and upper rubber-covered roller. After the bonding medium has been set by the heat, the backing and gelled sheet are separated from the support surface. It will be found that the gelled resin sheet strips easily off the support surface while remaining bonded to the backing sheet.

When it has cooled, the gelled plastisol film has a cellular structure due to the blowing agent released during gelling and also a surface which is patterned by moulding against the granule-coated surface of the support surface.

Finally, the plastic surface may be finished by abrading, which will give it a matte finish and a feel closely resembling suede. Other finishes, e.g., printing or overspraying, may be applied thereto. The film may be polychrome or of a single color, as can be effected in any known manner. The depth and dimensions of the surface pattern is of course a function of the size and distribution of the granules on the support surface which latter may equally be an endless steel band to which the granules can be secured by brazing, the whole being subsequently oversprayed with a silicone or like "releasing" medium. In any event, a random pattern is necessarily obtained, though in the case of an endless band there will naturally be a "repeat."

An additional decorative finish, of the nature of a color inlay, can be given to the sheet-like material of the invention by applying to the support surface drops or portions of resin in regular or random spaced apart positions and gelling said resin drops or portions prior to the application to said support surface of the over-all coating or layer of resin, the resins for part application and over-all application being differently colored.

Many and various plastisol compositions having known blowing agents therein are applicable for forming the synthetic suede of the invention. The following are examples of satisfactory compositions:

Example 1

| | Lbs. |
|---|---|
| Polyvinyl chloride resin | 50 |
| Dialkyl phthalate | 33.4 |
| Epoxidized soyabean oil | 5 |
| Iso-octyl epoxy stearate | 4 |
| Di-iso-octyl azelate | 7 |
| Azo-dicarbonamide | 3 |
| Barium zinc liquid stabilizer | 1.5 |
| Whiting filler | 7 |
| Pigment to suit. | |

Example 2

| | Lbs. |
|---|---|
| Polyvinyl chloride resin | 100 |
| Dioctyl phthalate | 100 |
| Di-n-butyl phthalate | 15 |
| Azo-dicarbonamide | 4 |
| Barium zinc liquid stabilizer | 1.5 |
| Whiting filler | 28 |
| Pigment to suit. | |

Example 3

| | Lbs. |
|---|---|
| Polyvinyl chloride resin | 100 |
| Dialkyl phthalate | 55 |
| Epoxidized soyabean oil | 12 |
| Iso-octyl epoxystearate | 10 |
| Di-iso-octyl azelate | 15 |
| Azo-dicarbonamide | 3 |
| Barium zinc liquid stabilizer | 1 |
| Pigment to suit. | |

In the accompanying drawing, constituting a part hereof, and in which like reference characters indicate like parts:

FIG. 1 is a schematic diagram showing the process up to abrasion; and

FIG. 2 is a schematic diagram of the abrasion step.

Referring to the drawing, an endless belt 1 of suitable textile or other material has fixed on its surface a layer of small abrasive particles of known character, such as silicon carbide. It is adapted to move in the direction of arrow 2 between supporting rollers 3 and 4. Driving roller 5 in conjunction with roller 4 actuates belt 1. A source 6 of plastisol composition 7 deposits it on the belt and a doctor blade 8 levels it with the tops of the granules as shown at 9. The belt carries the plastisol-blowing agent composition through oven 10 at a sufficient temperature for a sufficient time to gel the resin and activate the blowing agent to form a multiplicity of tiny cells.

After this, the belt and gelled layer pass between chilled roller 4 and sponge roller 11. Simultaneously, a textile or other sheet material 12 passes in the direction of arrow 13 over roller 14 past infra-red pre-heater 15, over roller 11 and into the nip of rollers 4 and 11 where plastisol layer 9 becomes adhered thereto and the laminate so formed passes over rollers 17, 18 and 19 and around tension roll 20, from which it is rolled up on take-up roll 21.

As shown in FIG. 2, laminate 21' passes around tension rollers 22 and rubber covered rollers 23 and roller 24. It then goes over tension roller 25 and under a series of pressure rolls 26 adapted to press laminate 9' against abrasive coated rollers 27 where the surface of the gelled composition is abraded, opening up the surface cells and forming a suede configuration. The suede sheet then passes over fixed speed haul roller 28 and around diversion roller 29, over adjustable roller 30 and to take-up roll 31. Between rollers 29 and 30, laminate 9' comes in contact with dust beater 32 to remove loose particles.

It will be appreciated that it is not intended to limit the scope of the invention to the features disclosed in the above examples, many variations being possible without departing from the principles of the invention. Thus, for example, the invention may be practiced with synthetic resins other than those based on polyvinyl chloride, and the support surface may be formed by any mineral particles secured to a base of any suitable material.

What is claimed is:

1. A method of producing synthetic suede comprising first applying a layer of plastisol containing a blowing agent onto a support surface comprising mineral particles fixed to a base and inert to said plastisol, leveling said layer to the peaks of said particles, then heating said plastisol for simultaneous gelling and blowing to form cells therein, applying a fabric on said layer to form a laminate, then stripping said laminate from said support surface, and then abrading the exposed surface of said plastisol layer, whereby at least some of said cells are ruptured to form a suede-like surface, said laminate being perforate.

2. A method according to claim 1 characterized in that said plastisol has a base of vinyl resin.

3. A method according to claim 1 characterized in that said plastisol has a base of a vinyl resin together with a plasticizer.

4. A method according to claim 1 characterized in that said plastisol is in the form of a flexible sheet.

5. A method according to claim 1 characterized in that said particles are of an abrasive carbide.

6. A method according to claim 1 characterized in that said particles are of about 60 to 100 mesh.

7. A method according to claim 1 characterized in that said plastisol has said fabric applied thereto after said gelling.

8. A method of producing synthetic suede comprising first applying a layer of plastisol containing a blowing agent onto a support surface comprising small abrasive particles fixed to a base and inert to said plastisol, leveling said layer, then heating said plastisol for simultaneous gelling and blowing to form cells therein, then stripping said layer from said support surface, and abrading one surface of said layer, whereby at least some of said cells are ruptured to form a suede-like surface.

9. A method according to claim 8 wherein said layer is level to the peaks of said particles, thereby producing a perforate synthetic suede.

10. A method according to claim 8 wherein a fabric is applied to one surface of said layer prior to stripping from said support surface, whereby a laminated synthetic suede is formed.

11. A synthetic suede which is the product of the process of claim 8.

12. A synthetic suede which is the product of the process of claim 9.

13. A synthetic suede which is the product of the process of claim 10.

14. A synthetic suede which is the product of the process of claim 1.

References Cited by the Examiner

UNITED STATES PATENTS

| 2,894,855 | 7/1959 | Wilhelm et al. | 117—103 |
| 2,962,738 | 12/1960 | Andrade et al. | 156—245 X |
| 3,041,193 | 6/1962 | Hamway et al. | 117—11 |

FOREIGN PATENTS

| 602,575 | 5/1948 | Great Britain. |

EARL M. BERGERT, *Primary Examiner.*

M. L. KATZ, *Assistant Examiner.*